United States Patent [19]

Tu Xuan

[11] 4,382,693
[45] May 10, 1983

[54] SINGLE PHASE BIPOLAR STEPPING MOTOR HAVING TWO ROTATION SENSES

[75] Inventor: Mai Tu Xuan, Chavannes, Switzerland

[73] Assignee: Societe Suisse pour l'Industrie Horlogere Management Services S.A., Bienne, Switzerland

[21] Appl. No.: 189,875

[22] Filed: Sep. 23, 1980

[30] Foreign Application Priority Data

Sep. 25, 1979 [FR] France ............... 79 24359

[51] Int. Cl.³ .................. G04F 5/00; G05B 19/40
[52] U.S. Cl. ..................................... 368/160; 318/696
[58] Field of Search ............ 368/76, 80, 155–160, 368/85, 87, 217–219; 318/138, 696; 310/40 R, 40 MM, 46, 49

[56] References Cited

U.S. PATENT DOCUMENTS

| | | | |
|---|---|---|---|
| 3,336,516 | 8/1967 | Kellet | 318/526 |
| 3,504,257 | 3/1970 | Smith | 318/252 |
| 3,810,354 | 5/1974 | Naikaido et al. | 58/23 D |
| 4,048,548 | 9/1977 | Nakajima et al. | 318/696 |
| 4,144,467 | 3/1979 | Nakajima et al. | 310/40 MM |
| 4,278,926 | 7/1981 | Bartlett | 318/696 |
| 4,282,464 | 8/1981 | Uzuka | 318/138 |
| 4,282,472 | 8/1981 | Martin | 318/696 |

FOREIGN PATENT DOCUMENTS

| | | |
|---|---|---|
| 1513747 | 4/1970 | Fed. Rep. of Germany . |
| 1538705 | 1/1971 | Fed. Rep. of Germany . |
| 1788126 | 8/1972 | Fed. Rep. of Germany . |
| 2209251 | 11/1973 | France . |
| 2238179 | 2/1975 | France . |

*Primary Examiner*—Vit W. Miska
*Attorney, Agent, or Firm*—Griffin, Branigan & Butler

[57] ABSTRACT

The invention comprises a single phase bipolar stepping motor in which the rotor may rotate in both senses. A stator is provided having two windings. When these are connected in series and fed with a first type of alternating polarity pulses, the rotor turns in a preferred sense. When the windings are connected in parallel and fed by a second type of alternating polarity pulses of opposite phase to the first type the rotor turns in the opposite sense. The motor is applied to advantage in time setting arrangements for analog display timepieces.

12 Claims, 16 Drawing Figures

SINGLE PHASE BIPOLAR STEPPING MOTOR HAVING TWO ROTATION SENSES

BACKGROUND OF THE INVENTION

This invention concerns a single phase bipolar electromagnetic stepping motor for timepiece use being capable of rotation in both senses and comprising a stator formed of a soft ferromagnetic material and a rotor constituted by a magnet having at least one pair of poles.

Electromagnetic single phase stepping motors with two rotation senses are known and to overcome difficulties which they may present the applicant has proposed a new solution in U.S. patent application No. 122,955 and which claims the fact that the moment of inertia, the volume and the number of pole pairs of the rotor are combined in order to satisfy a certain mathematical relationship and that the said rotor is driven in a rotation sense opposed to the preferred sense when the motor winding receives double pulses of alternate polarity comprised of a first pulse of which the polarity causes the rotor to turn through an angle less than one step in the preferred sense, the said first pulse being immediately followed by a secod pulse of which the polarity is opposed to the first, the said second pulse causing the rotor to turn through an entire step in the sense opposed to the preferred sense.

The invention which has just been mentioned is applied essentially to timepieces having only an hours hand and a minutes hand, that is to say to a motor of which the rotor advances only through one step each minute. Effectively the weight and increase in complexity as provided for this rotor, taking into account the necessity to assure a correct operation in both senses, must be compensated for by an increase in current consumption even during the normal operation of the watch. It follows that this type of motor is less suitable for a watch provided with a seconds hand where the rotor is caused to step one increment each second. The mentioned invention further requires that the motor winding be fed by a type of pulses which are composite and alternative thus rendering more difficult the feeding arrangement.

It is the purpose of the present invention to provide a stepping motor with operation in both senses of rotation, and which overcomes the difficulties cited, in which the consumption does not exceed that of an optimal motor having one sense of rotation only and in which the motor winding is fed by a simple type of alternating pulse.

It is another purpose of this invention to assure a more certain turning (or couple) in reverse rotation, such not being obtained with the systems of the prior art, and to avoid the necessity for a counter electromotive force detector, as provided in certain of these systems.

These purposes are obtained thanks to the claimed means.

DETAILED DESCRIPTION OF THE INVENTION

Figure 1A:
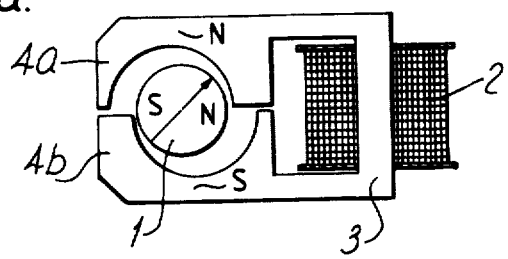
FIGS. 1a, 1b and 1c represent respectively an arrangement showing the principle of the single phase motor, the feed signal for this motor and the value of the turning moments as a function of the rotation angle of rotor for the preferred sense and according to the prior art.

FIG. 1a represents schematically an arrangement showing the principle of a single phase bipolar stepping motor of a known type. A cylindrical permanent magnet 1 with a diametral polar arrangement SN constitutes the rotor of this motor. Its stator comprises a single winding 2 which when excited provides a magnetic flux which is brought to the gap by means of core 3 and pole pieces 4a and 4b realised in a soft ferromagnetic material. When stationary the rotor occupies the position of minimum reluctance such as shown on FIG. 1a. If a positive pulse is applied to the winding the rotor turns through a step, that is to say 180°; a second pulse this time negative will permit the rotor to continue its rotation in the same sense and to step through a new step and so on. This is what may be referred to as the preferred sense.

Figure 1B:
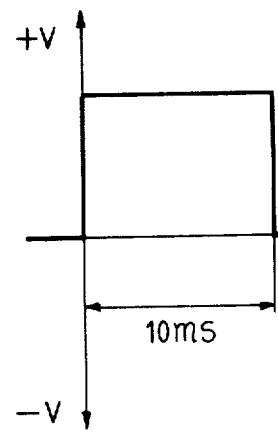

FIG. 1b shows as a function of time a first type of simple pulses having alternative polarity which will cause the motor to advance in the preferred sense. The duration of each pulse is generally comprised between 4 and 12 ms according to the motor design.

Figure 1C:
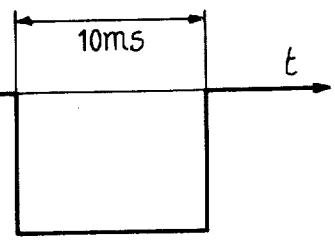

FIG. 1c represents the value of couples C which act on a rotor as a function of its rotation angle α. A preferred sense is that of the positive values of the rotation angle α and the opposed sense to the preferred is that of the negative values of the rotation angle α. As is well known the rotor of the motor is subject to two types of turning moments. A static moment Ca which serves to maintain the rotor and is due to the magnet alone, and a dynamic motor moments Cab due to the interaction of the magnetic flux, with the flux of the winding when the latter is fed with a current. From the construction of the motor these couples are out of phase by approximately 45° relative to one another. Should a positive pulse be applied to the winding, pole 4a becomes a north pole and pole 4b a south pole (see FIG. 1a) and the rotor will turn through 180° in a clockwise sense. Points S'$_2$, S$_1$ and S$_2$ are stable points of equilibrium in the absence of current (point S$_1$ represents the position of the rotor such as shown in FIG. 1a), while points I'$_1$ and I$_1$ are points of unstable equilibrium. In the preferred sense the rotor is brought from point S$_1$ to point I$_1$ by the mutual couples Cab the remaining portion of the travel from I$_1$ to S$_2$ being accomplished thanks to the stored kinetic and potential energy between S$_1$ and I$_1$. Surface A$_1$ represents useful energy which one may furnish to the motor in the preferred sense. Surface A$_2$ represents the maintaining or positioning energy (to which it is necessary to add the energy due to the friction losses). As these two energies are in opposed senses it is necessary in order that the motor advance through a step A$_1$ be greater than A$_2$, this being the case for known types of stepping motors.

Figure 2:
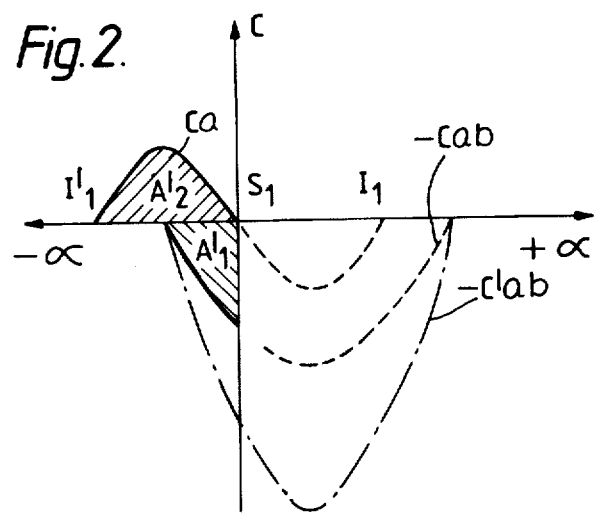
FIG. 2 represents the value of the turning moments as a function of the angle of a rotation of the rotor, if the feed pulses are of inverted polarity to those shown in FIG. 1b.

FIG. 2 represents the value of the turning moments as a function of the rotation angle of the rotor if the feed pulses are of an inverted polarity to that shown in FIG. 1b. Effectively it might be questioned, if in the feed method known from FIG. 1b it would not be sufficient, in order to attain the present purpose, to invert the polarity of the controlled signal to reverse the operational sense of the motor. FIG. 2 shows once again the holding couple Ca for which the polarity and the amplitude have not changed since they are dependent only on the magnet. The amplitude of the mutual couple −Cab is equally the same since resulting from a pulse of the same amplitude but its polarity is inverted since resulting from an inverted polarity pulse. One will note here that the use of energy which may be furnished to the motor as represented by the surface A'$_1$ is smaller than the holding energy A'$_2$. Consequently the rotor is not capable of turning through a step in the sense opposed to the preferential. One may attain the purpose desired by increasing the amplitude of the pulse to effect the couple −C'ab, but this will constitute major disadvantage for the realisation of the control feeding.

Figure 3:
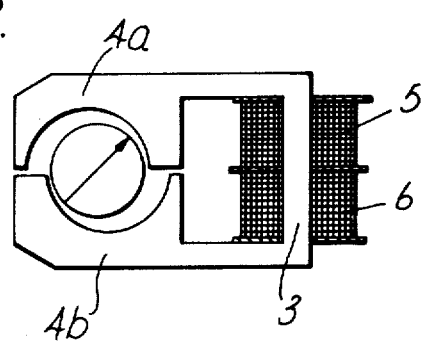
FIG. 3 shows a first variant of the principle of the motor according to the invention.

FIG. 3 represents a first variant of the principle of the motor according to the invention. It is distinguished from the prior art as shown in FIG. 1a by the fact that the stator of the motor carries on its core 3, two windings 5 and 6 place side-by-side. In one example of winding and for the motor which will be subsequently explained, each winding comprises 7,500 turns, the resistance and the inductance of one winding are respectively 1,900 ohms and 1,63 henrys. This first variant may comprise a subspecies if the windings instead of being placed side-by-side are placed one over the other.

Figure 4:
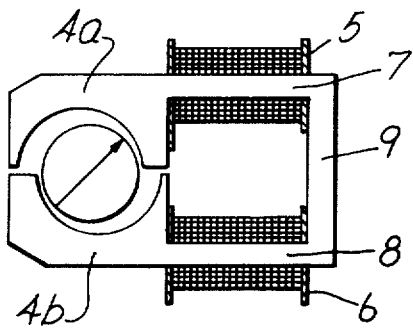
FIG. 4 represents a second variant of the principle of the motor according to the invention.

FIG. 4 represents a second variant of the principle of the motor according to the invention. Relative to FIG. 1a one may see that the magnetic circuit comprises in addition to pole pieces 4a and 4b and the frame 9, two cores 7 and 8 on which are placed windings 5 and 6.

Other variants of the motor may be imagined without departing from the object of the invention provided that they include in the same magnetic circuit two distinct windings.

The invention is based on the principle of placing in series or parallel of the two said windings according to whether one wishes the motor to turn in its preferred sense or in the opposite sense. By the preferred sense must be understood that for which the motor consumption is small and that is used for the normal operation of the watch. By the opposite sense must be understood that for which the motor consumption is greater and thus that which is used to rotate the hands occasionally in a counterclockwise sense, for example when one wishes to set the time or change the time zone.

The principle by which the motor functions will now be explained by means of graphs 5a to 8b which show four cases which may arise, two in a preferred sense and two in the opposite sense.

Preferred Sense

Figure 5A:
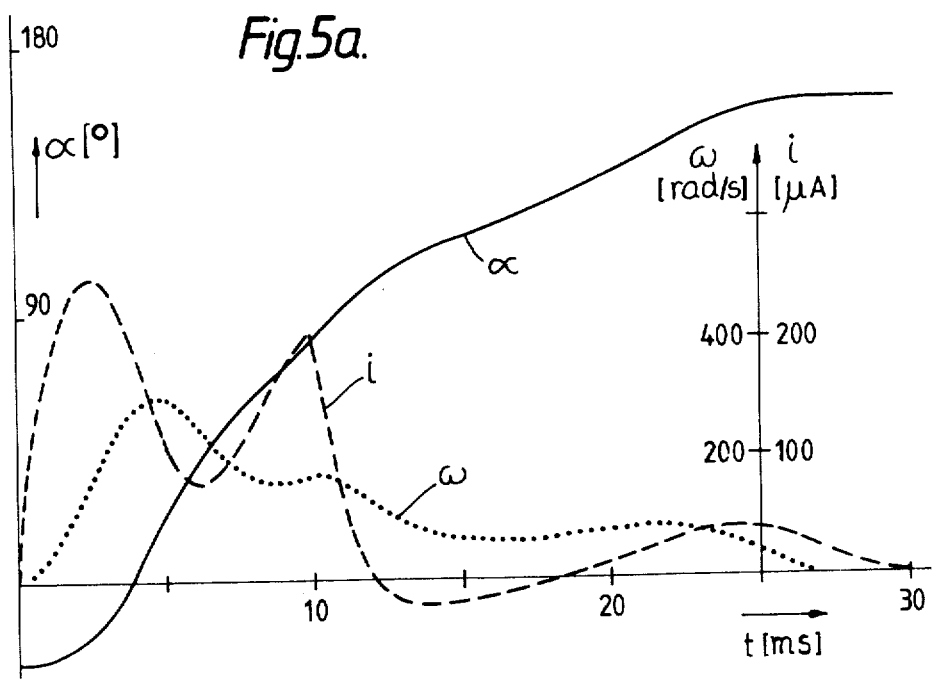
FIGS. 5a and 5b are diagrams showing the functioning of the motor in its preferred sense of rotation responsive to a normal pulse, the two motor windings being coupled in series according to the invention.
Figure 5B:
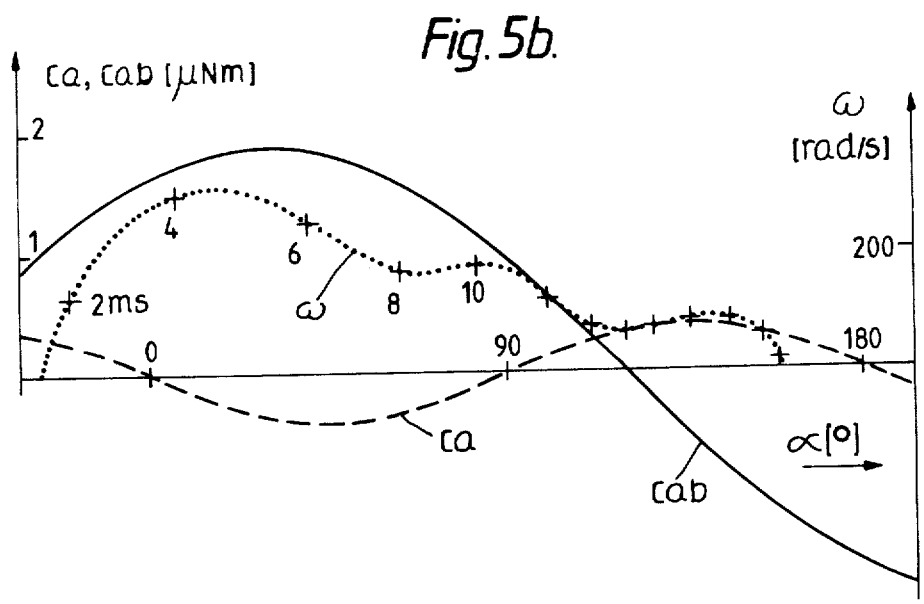

Case 1. The motor is fed by simple alternating pulses as shown in FIG. 1b. In the example as chosen and for a given motor the pulses have a duration of 10 ms corresponding to an optimalisation of the operation of the motor, for which the yield is maximum. Windings 5 and 6 in the motor as shown in FIGS. 3 and 4 are coupled in series by means of a system of switches which will be described further on. With the values as mentioned above for the windings, the resistance is in the order $R = 3,800 \Omega$, the number of turns $W = 15,000$ and the inductance $L = 6.52$ H. If one may accept for this type of motor a mutual couple Cab per ampere-turn of $3.2 \cdot 10^{-7}$ Vs, the coupling factor which is defined by the mutual couple per ampere-turn times the number of windings is equal to $Cab/i = 4.8 \cdot 10^{-3}$ Vs. FIG. 5a represents the current i, the angle $\alpha$ and the angular velocity $\omega$ as a function of the time for a useful couple of 0.3 $\mu$ Nm in the preferred sense. An examination of the curve of current in the winding shows that the feed takes place during 10 ms and from this moment on the winding is short-circuited; this having for purpose to dampen the residual movement of the motor at the end of a step. The curve $\alpha$ shows that the rotor has stepped through one step ($\alpha = +180°$) and after about 30 ms the rotor is stabilised at its new stationary point as is indicated also by the angular velocity $\omega$ which has fallen to zero. FIG. 5b shows the diagrams of the motor couple (Cab) and a positioning couple (Ca) as well as the angular velocity $\omega$ as a function of the angular position $\alpha$ of the rotor and for the same conditions of load of 0.3 $\mu$ Nm. The diagram $\omega$ carries moreover a time scale which permits one to note at which instant is attained the velocity $\omega$ of the rotor for given angular position $\alpha$. This first case is that which may be presented in the normal operation of a timepiece.

Figure 6A:
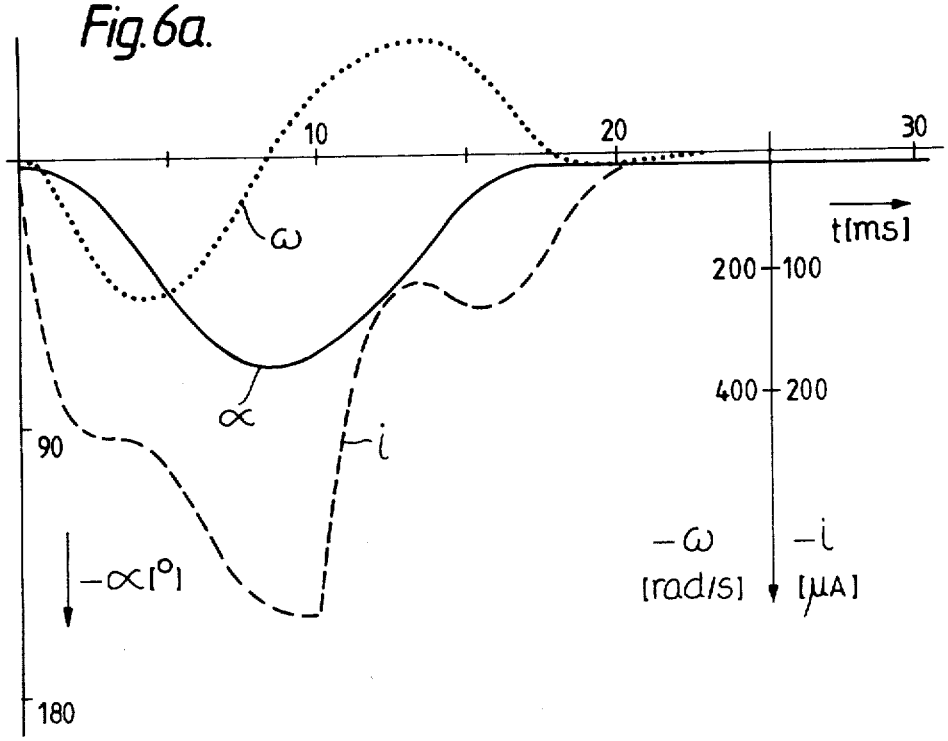
FIGS. 6a and 6b are diagrams showing the functioning of the motor in the preferred sense responsive to a pulse in a sense opposed to the normal, the two motor windings being coupled in series according to the invention.
Figure 6B:
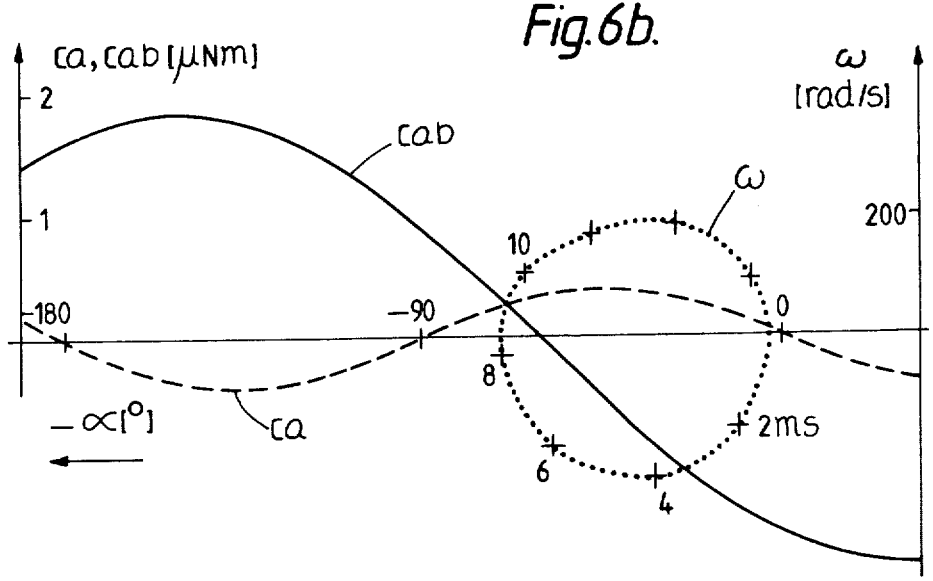

Case 2. One may now suppose that following a shock, for instance, the rotor has accidentally stepped through one step. The situation is now as studied in FIG. 2. The motor is now about to receive a negative pulse which would have a tendency to reverse the motor through a step. FIGS. 6a and 6b show how the motor will react to this negative pulse, all the other conditions of coupling of the windings being the same as those described in case 1 above. Curves $\alpha$ and $\omega$ illustrate the fact that during a certain time (from 0 to 8 ms) the rotor is displaced in a sense opposed to the preferred to return to its point of departure (from 8 to 18 ms) and that the potential and kinetic energy do not permit it to cross the instable point of equilibrium situated at $\alpha = -90°$. The next pulse, this time positive, will restore the motor to its normal conditions of operation explained relative to case 1 and will continue to drive it in the preferred sense.

Sense Opposed to the Preferred

Figure 7A:
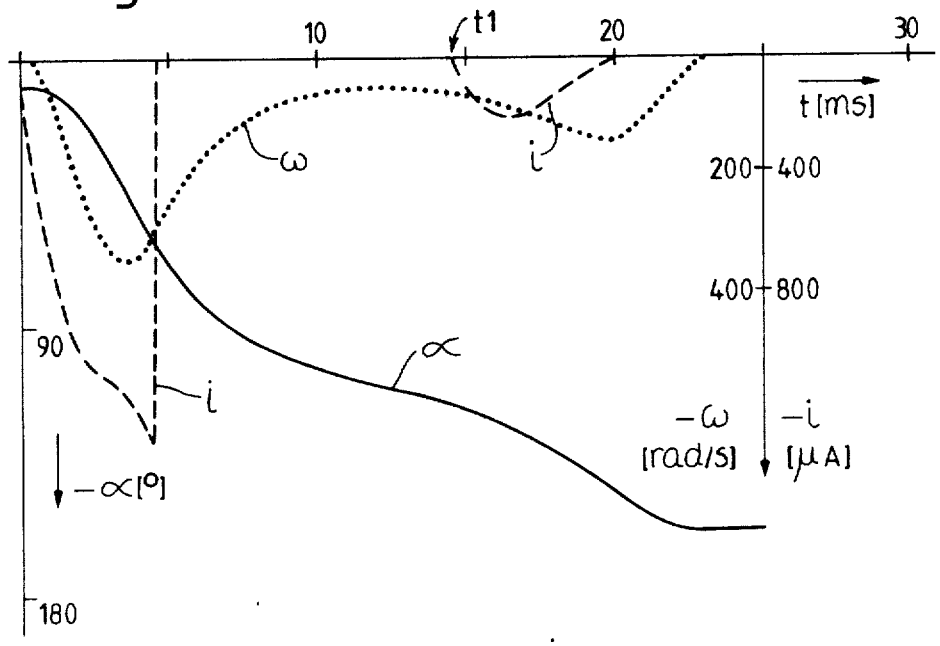
FIGS. 7a and 7b are diagrams showing the functioning of the motor in the opposed sense to the preferential responsive to a normal pulse, the two motor windings being coupled in parallel according to the invention.
Figure 7B:
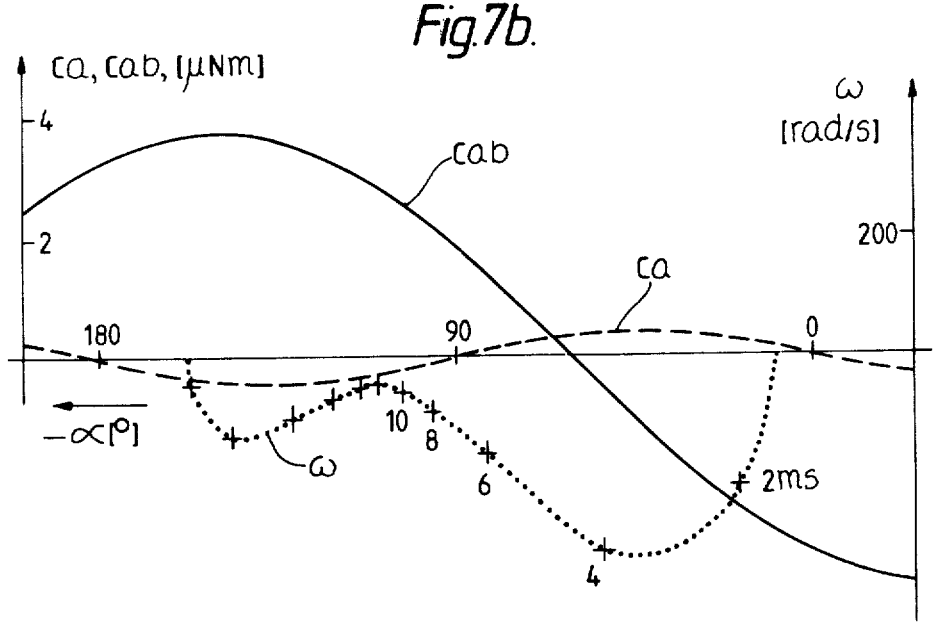

Case 3. The motor is fed by simple alternating pulses shown in FIG. 9. For the same motor as assumed the pulses have a duration of 4.5 ms. The windings 5 and 6 of the motor presented in FIGS. 3 and 4 are coupled in parallel. With values as mentioned for the windings, the resistance is equal to R=950Ω, the number of turns W=7,500 and the inductance L=1.63 H. With the same value of the mutual couple Cab per ampere-turn of $3.2 \cdot 10^{-7}$ Vs, the coupling factor reduced to $2.4 \cdot 10^{-3}$ Vs. FIG. 7a represents the current i, the angle α and the angular velocity ω as a function of time for a useful couple of 0.2 μ Nm in sense opposed to the preferred. Examination of the current curve i in the winding shows that the feed takes place during 4.5 ms and that at this moment the winding is open-circuited until a time $t_1$ ($t_1 = 14.5$ ms), this having for purpose to avoid braking due to the current induced in the motor winding. From time $t_1$ on and until the arrival of the next motor pulse the winding is short-circuited for the same reason as discussed above in respect of case 1. It must be remarked here that the current i is much greater (on the order of 1,300 μ A) than that existing for the preferred sense. As the opposite sense is only occasionally used this increase of current causes only a negligible shortening of the battery life. Curve α shows that the rotor has stepped through a step in the opposed sense (α = −180°) and that after approximately 30 ms the rotor has been stabilised at its new point of stability as shown also by the angular velocity ω which has fallen to zero. FIG. 7b represents the diagrams of the motor couple (Cab) and positioning couple (Ca) as well as the angular velocity ω as a function of the angular position α of the rotor and for the same conditions of load 0.2 μ Nm. As in the preceeding cases the diagram ω provides moreover a time scale in ms. This third case is that which arises when one wishes to set the watch or to correct the time zone.

Figure 8A:
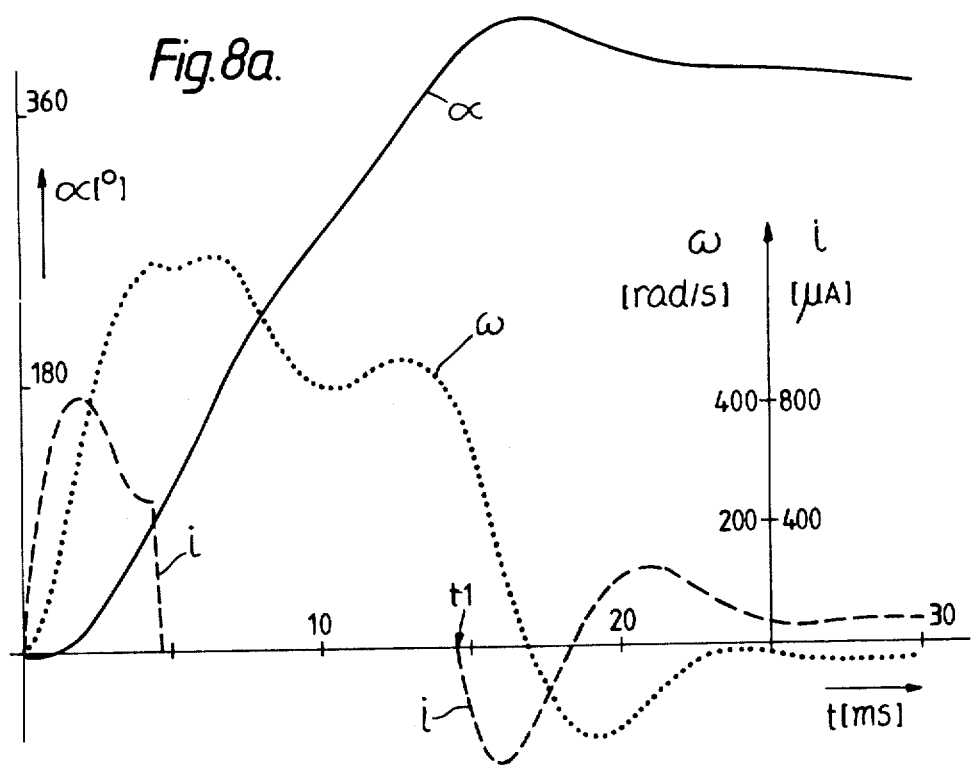
FIGS. 8a and 8b are diagrams showing the functioning of the motor in the opposed sense to the preferential responsive to a pulse of a sense opposed to the normal, the two motor windings being coupled in parallel according to the invention.
Figure 8B:
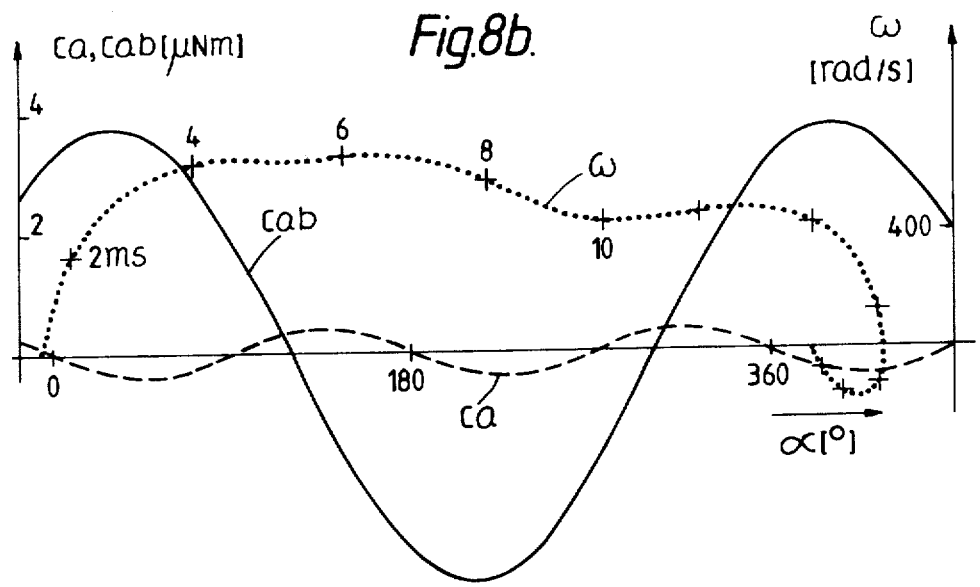

Case 4. As for case 2 one may now suppose that following a shock the rotor has accidentally stepped. Thus the situation is as shown in FIGS. 1b and 1c. The motor will receive a positive pulse to cause stepping in the preferred sense. FIGS. 8a and 8b show how the motor reacts to this positive pulse, all other conditions of coupling of the windings being the same as that described for case 3 above. The winding receives a strong current pulse in the preferred sense giving it a high angular velocity and the stepping successively of two steps for a single pulse (α = +360°). The next pulse, negative this time, will restore the motor to the conditions of operation for operating in the sense opposed to the preferred as shown in respect of case 3.

All graphs shown in FIGS. 5a to 8b show clearly that the system of coupling the two windings as an object of the invention operates as surely in one sense as in the other: in the preferred sense it permits optimum motor construction with a minimum consumption; in the opposite sense it permits high energy positioning, thanks to the current developed in the windings placed in parallel. One may see also that following a shock applied to the rotor or a sudden increase in load the system either does not react in response to a pulse in the wrong sense by stepping in the preferred sense or on the contrary reacts by stepping twice only in the opposite sense in response to a pulse in the wrong sense, this being of no consequence in this application.

Figure 9:
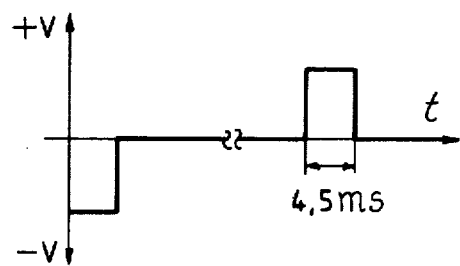
FIG. 9 represents the motor feed signal for operation in the sense opposed to the preferential.
Figure 10:
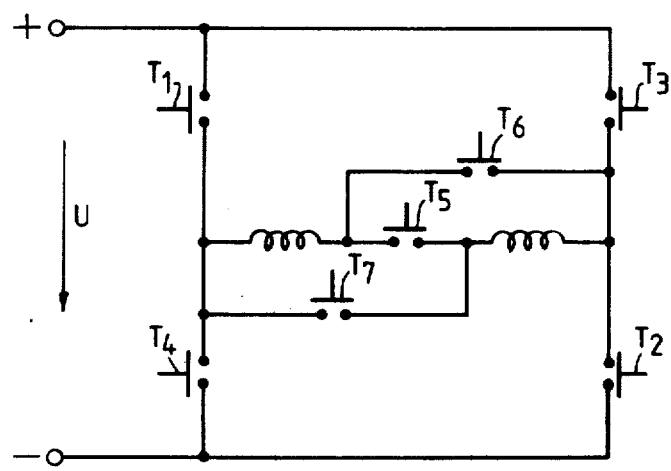
FIG. 10 shows a feeding scheme for the motor according to the invention.

Finally FIG. 10 is a feeding scheme for the motor according to the invention. Windings 5 and 6 are fed by voltage U. The switches $T_1$ to $T_4$ produce bipolar signals such as shown in FIG. 1b or 9. They assure equally the open-circuited or short-circuited of the motor windings. Switches $T_5$ to $T_7$ assure the coupling in series or parallel of the two windings. According to whether the preferred sense or the opposed sense are under consideration one will have the following situations:

|  | $T_1$ | $T_2$ | $T_3$ | $T_4$ | $T_5$ | $T_6$ | $T_7$ |
|---|---|---|---|---|---|---|---|
| Preferred sense (0 = open; 1 = closed) | | | | | | | |
| Positive pulse | | | | | | | |
| 0–10 ms | 1 | 1 | 0 | 0 | 1 | 0 | 0 |
| 10 ms–1 s | 1 | 0 | 1 | 0 | 1 | 0 | 0 |
| Negative pulse | | | | | | | |
| 0–10 ms | 0 | 0 | 1 | 1 | 1 | 0 | 0 |
| 10 ms–1 s | 1 | 0 | 1 | 0 | 1 | 0 | 0 |
| Sense opposed to the preferred (0 = open; 1 = closed) | | | | | | | |
| Positive pulse | | | | | | | |
| 0–4.5 ms | 1 | 1 | 0 | 0 | 0 | 1 | 1 |
| 4.5 ms–14.5 ms | 0 | 0 | 0 | 0 | 0 | 1 | 1 |
| 14.5 ms–1 s | 1 | 0 | 1 | 0 | 0 | 1 | 1 |
| Negative pulse | | | | | | | |
| 0–4.5 ms | 0 | 0 | 1 | 1 | 0 | 1 | 1 |
| 4.5 ms–14.5 ms | 0 | 0 | 0 | 0 | 0 | 1 | 1 |
| 14.5 ms–1 s | 1 | 0 | 1 | 0 | 0 | 1 | 1 |

In the technology actually employed transistors are employed as switches. They are controlled by signals taken from the frequency divider of the timepiece.

What we claim is:
1. A timepiece motor assembly including:
    a single-phase bipolar electromagnetic stepping motor including a rotor formed of a magnet having at least one pair of poles and a stator formed of a soft ferromagnetic material extending between said poles and two windings wrapped thereabout, said rotor being capable of rotation in both senses;
    a signal-feeding means coupled to said two windings for energizing said two windings with first and second types of electrical pulses for respectively causing rotation of said rotor in opposite senses, said signal-feeding means including switching means for interconnecting said windings in series one with the other to receive said first type of electrical pulses and thereby rotate said rotor in a first sense and for interconnecting said windings in parallel one with the other to receive said second type of electrical pulses and thereby rotate said rotor in an opposite sense.

2. A motor assembly as set forth in claim 1 wherein the rotor is arranged to drive time indicating hands for a time display when said windings receive pulses of said first type.

3. A motor assembly as set forth in claim 1 wherein said soft ferromagnetic material includes a core on which said windings are placed side-by-side.

4. A motor assembly as set forth in claim 1 wherein said windings are placed one over the other on said ferromagnetic material.

5. A motor assembly as set forth in claim 1 wherein the stator includes two ferromagnetic-material cores each carrying one of said windings.

6. A motor assembly as set forth in claim 1 wherein said first type of electrical pulses comprises a train of alternate polarity pulses.

7. A motor assembly as set forth in claim 6 wherein said switching means is for interconnecting said windings to short circuit them in the interval separating the end of one pulse and the beginning of the next succeeding pulse.

8. A motor assembly as set forth in claim 1 wherein said second type of electrical pulses comprises a train of alternate polarity pulses being of opposite phase to the first type of pulses.

9. A motor assembly as set forth in claim 8 wherein said switching means is for interconnecting said windings to initially open-circuit them during a period separating the end of a pulse and a time $t_1$, then to short-circuit them during a period separating said time $t_1$ and the beginning of the next succeeding pulse.

10. A motor assembly as set forth in claim 6 wherein the duration of each pulse is between 4 ms and 12 ms.

11. A motor assembly as set forth in claim 8 wherein the duration of each pulse is between 2 ms and 6 ms.

12. A motor assembly as set forth in claim 9 wherein the time $t_1$ is between 5 ms and 18 ms.

* * * * *